(12) United States Patent
Domnick et al.

(10) Patent No.: US 8,067,090 B2
(45) Date of Patent: Nov. 29, 2011

(54) COLOR EFFECT PIGMENT WITH A LAYER MADE OF DISCRETE METAL PARTICLES, METHOD FOR THE PRODUCTION THEREOF AND ITS USE

(75) Inventors: Ralph Domnick, Buckenhof (DE); Georg Bauer, Eferding (AT); Christian Wolfrum, Erlangen (DE); Hans-Jorg Kremitzl, Eckental (DE); Thomas Klaumunzer, Forchheim (DE); Thomas Schuster, Lauf (DE)

(73) Assignee: Eckart GmbH, Hartenstein (DE)

( * ) Notice: Subject to any disclaimer, the term of this patent is extended or adjusted under 35 U.S.C. 154(b) by 651 days.

(21) Appl. No.: 12/090,683

(22) PCT Filed: Oct. 18, 2006

(86) PCT No.: PCT/EP2006/010043
§ 371 (c)(1),
(2), (4) Date: Jun. 11, 2008

(87) PCT Pub. No.: WO2007/045452
PCT Pub. Date: Apr. 26, 2007

(65) Prior Publication Data
US 2008/0318012 A1    Dec. 25, 2008

(30) Foreign Application Priority Data

Oct. 18, 2005 (DE) .......................... 10 2005 050 094

(51) Int. Cl.
*B32B 5/16* (2006.01)

(52) U.S. Cl. ....... 428/403; 106/1.18; 106/499; 428/405; 428/407

(58) Field of Classification Search .......... 428/403–407; 106/1.18, 499
See application file for complete search history.

(56) References Cited

U.S. PATENT DOCUMENTS

| | | | |
|---|---|---|---|
| 3,438,796 A | 4/1969 | Hanke | |
| 3,440,075 A | 4/1969 | Marshall | |
| 3,536,520 A | 10/1970 | Marshall et al. | |
| 4,158,074 A | 6/1979 | Uchiyama | |
| 4,976,787 A * | 12/1990 | Ito et al. ........................ | 106/441 |
| 5,116,664 A | 5/1992 | Kimura et al. | |
| 5,135,812 A | 8/1992 | Phillips et al. | |
| 5,607,504 A | 3/1997 | Schmid et al. | |
| 5,611,998 A | 3/1997 | Aussenegg et al. | |
| 5,624,486 A | 4/1997 | Schmid et al. | |

(Continued)

FOREIGN PATENT DOCUMENTS

DE     1 467 468     12/1968
(Continued)

OTHER PUBLICATIONS

International Search Report for PCT/EP2006/010043 dated Jul. 26, 2007.
(Continued)

*Primary Examiner* — Hoa (Holly) Le
(74) *Attorney, Agent, or Firm* — Nixon & Vanderhye P.C.

(57) ABSTRACT

The invention relates to a platelike color effect pigment having the following structure: a) a metallic reflective core; b) a spacer layer made of a dielectric material, and; c) an, all in all, semitransparent absorber layer comprising, in essence, discrete metal particles that have an average diameter of 1 to 100 nm and optionally at least one other protective layer.

46 Claims, 5 Drawing Sheets

U.S. PATENT DOCUMENTS

Figure 1:
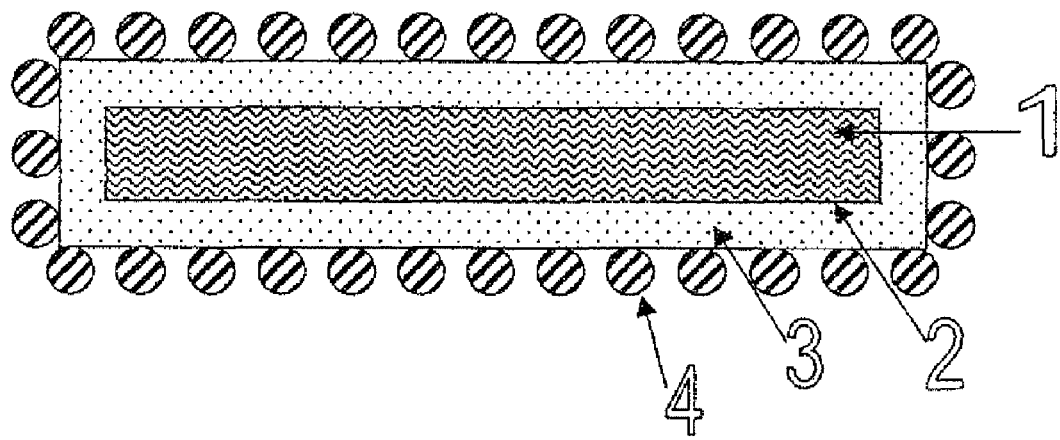

| | | | |
|---|---|---|---|
| 5,733,364 A | 3/1998 | Schmid et al. | |
| 5,931,996 A | 8/1999 | Reisser et al. | |
| 6,136,083 A * | 10/2000 | Schmidt et al. | 106/403 |
| 6,485,556 B1 | 11/2002 | DeLuca, Jr. | |
| 6,521,036 B1 | 2/2003 | Bleikolm et al. | |
| 6,569,529 B1 | 5/2003 | Phillips et al. | |
| 6,596,070 B1 | 7/2003 | Schmid | |
| 6,676,741 B2 * | 1/2004 | Phillips et al. | 106/417 |
| 6,686,042 B1 | 2/2004 | LeGallee | |
| 6,689,205 B1 | 2/2004 | Bruckner et al. | |
| 6,699,313 B2 * | 3/2004 | Coulter et al. | 106/31.6 |
| 6,777,085 B1 * | 8/2004 | Argoitia et al. | 428/403 |
| 6,783,584 B2 | 8/2004 | Takahashi | |
| 6,878,445 B2 * | 4/2005 | Hattori et al. | 428/402 |
| 6,884,289 B2 * | 4/2005 | Schoen et al. | 106/415 |
| 7,060,126 B2 * | 6/2006 | Andes et al. | 106/415 |
| 2002/0192448 A1 * | 12/2002 | Schoen et al. | 428/216 |
| 2003/0203222 A1 | 10/2003 | Phillips et al. | |
| 2003/0203223 A1 | 10/2003 | Phillips et al. | |
| 2003/0215641 A1 | 11/2003 | Phillips et al. | |
| 2004/0244649 A1 | 12/2004 | Kato et al. | |
| 2008/0102269 A1 * | 5/2008 | Herzing et al. | 428/336 |

FOREIGN PATENT DOCUMENTS

| | | |
|---|---|---|
| DE | 100 41 038 A1 | 3/2002 |
| DE | 101 20 179 A1 | 10/2002 |
| DE | 102 08 036 A1 | 8/2003 |
| EP | 1 235 882 B1 | 1/2005 |
| WO | WO 99/47702 | 9/1999 |
| WO | 02/31058 | 4/2002 |
| WO | WO 02/31058 A1 | 4/2002 |

OTHER PUBLICATIONS

Greiwe et al.: "A New Class of Aluminum Pigment," Paint and Ink International, Redhill, GB, vol. 10, No. 4, Jul. 1997, pp. 14, 16-17, XP000198751.

International Search Report.

Greiwe et al, "A New Class of Aluminium Pigment", Paint and Ink International, Redhill, GB, Bd. 10, Nr. 4, Jul. 1997, Seiten 14, 16-17, XP000198751.

* cited by examiner ant metal layer—transparent dielectric spacer layer—metallic reflector layer—transparent dielectric spacer layer—semitransparent metal layer. This layer sequence can be detached from the carrier film in subsequent operations and be comminuted to the desired particle size by means of ultrasound for example.

COLOR EFFECT PIGMENT WITH A LAYER MADE OF DISCRETE METAL PARTICLES, METHOD FOR THE PRODUCTION THEREOF AND ITS USE

This application is the U.S. national phase of International Application No. PCT/EP2006/010043 filed 18 Oct. 2006 which designated the U.S. and claims priority to German Application No. 10 2005 050 094.3 filed 18 Oct. 2005, the entire contents of each of which are hereby incorporated by reference.

This invention relates to a colored effect pigment, to a process for production thereof, and also to uses.

Several processes for producing effect pigments are known from the prior art. These processes involve various thin layers being applied to natural or artificially produced micrometer-size platelets either wet chemically or via CVD or PVD processes. Alternatively, various thin layers can be applied to a foillike substrate, subsequently be detached from the substrate and then comminuted to the size characteristic of effect pigments.

Effect pigments where a sequence of interference-forming layers which causes the color effect is applied to a transparent substrate are known generically as pearly luster or pearlescent pigments. The transparent substrate generally consists of a natural or synthetic mica or of synthetically produced metal oxides. Interference-forming layers comprise metal oxides.

U.S. Pat. No. 6,485,556 B1 (Engelhard Corp.) describes a pearlescent pigment wherein an expensively obtained $TiO_2$ substrate is coated with interference layers of chromium oxide and iron oxide.

U.S. Pat. Nos. 6,596,070 B1 and 6,689,205 B1 (both to Merck) describe platelet-shaped pearly luster pigments having a transparent core and a layer sequence formed of alternating high-refractive and low-refractive metal oxide layers.

U.S. Pat. No. 6,884,289 B2 (Merck) discloses colored pearly luster pigments wherein a transparent platelet-shaped substrate is coated with at least three layers of a dielectric material and additionally with absorbing organic or inorganic pigment particles.

DE 101 20 179 A1 describes a luster pigment wherein a layer sequence formed of a plurality of layers has been applied to transparent platelet-shaped sheet-silicates, in particular mica, talcum, kaolin and the like, used as a substrate.

German Offenlegungschrift 1 467 468 discloses a mica flake pigment comprising a coating of metal oxide particles on translucent mica flakes.

All these pearlescent pigments have a more or less intensive interference color effect due to their layered construction, but also always poor hiding and no metallic luster whatsoever.

In contrast to the relatively transparent pearlescent pigments, there are also different metal effect pigments whose color is due either to the reflective properties of the metal or to other color-conferring substances on the surface.

For instance, U.S. Pat. No. 4,158,074 (Showa Aluminum KK) discloses metal pigments surface coated with color-conferring metal salts. U.S. Pat. No. 5,931,996 (Eckart) describes aluminum pigments encapsulated with a metal oxide layer comprising colored pigments. These pigments have intensive colors and a metallic luster, albeit reduced compared with mixtures of metal effect pigments and colored pigments. Nor do these pigments exhibit any color flop.

Attempts have been made to overcome this disadvantage by producing pigments comprising a combination of a mirror, a dielectric layer and an absorber layer. The color of such pigments is often dependent on the viewing angle.

U.S. Pat. No. 3,438,796 (DuPont) describes alternating, PVD-produced layer sequences of aluminum and $SiO_2$ which have a metallic appearance. The color of these pigments can be varied by varying the $SiO_2$ layer thicknesses. The disadvantage is that the products are only obtainable in a small amount and in an extremely costly and inconvenient manner.

U.S. Pat. No. 3,536,520 (DuPont) discloses a process for producing a metallically lustrous pigment wherein, in a first step, a glass or mica substrate is coated in a liquid phase with a metallic nickel layer whereto an interference layer of nickel oxide or titanium oxide is then applied in a second step. The interference colors obtained thereby are, however, relatively weak.

U.S. Pat. No. 5,607,504 (BASF AG) describes colored luster pigments wherein a core formed from a metal effect pigment has applied to it, wet chemically or via gas phase reaction, a colorless low-refractive dielectric layer and thereon, applied by CVD, a high-refractive selectively absorbing layer composed of a colored or colorant-additized metal oxide.

U.S. Pat. No. 5,624,486 (BASF AG) describes luster pigments wherein platelet-shaped substrates (metallic pigments) are coated with a first layer of silicon oxide, aluminum oxide or aluminum oxide hydrate and a second layer of a metal and/or of a non-selectively absorbing, i.e., black, metal oxide. A (substantially) uninterrupted metal film is always applied in these pigments.

U.S. Pat. No. 5,733,364 (BASF AG) discloses a further luster pigment wherein a further layer of a transparent or selectively absorbing material may be applied. However, all the operations are carried out in a gas phase process which is relatively costly and inconvenient and difficult to control.

U.S. Pat. No. 6,783,584 B2 (Merck) describes colored platelet-shaped pigments wherein the substrate—a metallic pigment—is coated first with a protective layer of silica and/or alumina, then with an interference layer of a high-refractive metal oxide ($TiO_2$, for example) and thereon with a dense, semitransparent metal film. All the coating steps here are carried out in dispersion.

EP 1 235 882 B1 (Engelhard Corp.) describes precious metal color effect materials wherein a platelet-shaped substrate is encapsulated with a reflective precious metal layer, a transparent layer of $SiO_2$ or $MgF_2$ and also with a selectively light-absorbing layer. Here too it is expressly mentioned that all the layers have a uniform, homogeneous and film-like structure.

U.S. Pat. No. 5,135,812 (Flex Products, Inc.) describes a process for producing a luster pigment wherein different layers are PVD deposited on a flexible film with or without a release coat. This can give a layer sequence of semitransparent metal layer—transparent dielectric spacer layer—metallic reflector layer—transparent dielectric spacer layer—semitransparent metal layer. This layer sequence can be detached from the carrier film in subsequent operations and be comminuted to the desired particle size by means of ultrasound for example.

U.S. Pat. No. 6,686,042 (Flex Products, Inc.) describes optically variable foils or pigments wherein a metallic reflector layer has additionally applied to it a selectively absorbing layer and thereon the dielectric spacer layer and semitransparent absorber layer.

U.S. Pat. No. 6,521,036 B1 (SICPA Holding S.A.) discloses optically variable, PVD-produced pigments having a symmetrical sequence of layers. The sequence of layers comprises a core of a totally reflective metal layer composed of a corrosion-resistant aluminum alloy, a dielectric layer ($SiO_2$ or $MgF_2$) and a semitransparent partially reflecting layer.

The prior art described above always uses uninterrupted and very dense layers to obtain color effects.

In contrast to this, according to U.S. Pat. No. 3,440,075 (DuPont) discrete metal particles of silver are precipitated onto a transparent platelet-shaped substrate consisting of mica or glass, and are optionally stabilized by means of a water-containing layer of metal oxide. The disadvantage with this kind of pigments is that they only give yellowish and relatively weak hues.

US 2004/0244649 A1 describes a process for coating a carrier material with a (precious metal) colloid. A layer comprising embedded metal particles has been applied directly to the substrate. The colors of the proposed pigments is determined by the light absorption of the metal particles.

DE 102 OS 036 A1 (November AG) discloses a process wherein a transparent polymeric film has applied to it, via vaporization and sputtering processes, first a specular layer, thereon a dielectric spacer layer and thereon an absorber layer composed of discrete particles of metal. This makes it possible to obtain a particularly intensive coloring effect which like the Fabry-Perot effect is angle dependent. The sequence of layers additionally has a characteristic and machine-readable absorption spectrum due to the metal particles, and hence is useful for producing forgery-proof markings. However, there is no indication that effect pigments are obtainable in this way. In addition, the color effects here are obtained by sputtering, a process which would be completely uneconomical for larger areas of the kind relevant to pigments.

DE 100 41 038 A1 discloses spherical metal oxide particles having a particle diameter from 5 nm to 10 000 nm. To improve attachment to various matrices, the metal oxide particles have particulate elevations on the surface.

It is an object of the present invention to eliminate the prior art disadvantages. More particularly, there shall be provided an effect pigment with intensive coloring and, depending on the elaboration, with more or less pronounced dependence of the color on the observer angle and color flops, respectively. The metallic luster of the effect pigments according to the present invention shall be comparable to those of pure metal pigments. Furthermore, the effect pigments of the present invention shall have spectrally exactly defined absorption bands of very high absolute intensity. The absorption properties of the effect pigment shall ideally be machine capturable. It is a further object of the present invention to provide a process for inexpensive production of the effect pigment.

In accordance with the present invention there is provided an effect pigment comprising
a) a platelet-shaped metallic reflector core,
b) a spacer layer of a dielectric material applied on the reflector core and,
c) a semitransparent absorber layer applied on the spacer layer and comprising essentially discrete metal particles which have an average diameter of from 1 to 100 nm.

The present invention provides a semitransparent absorber layer, consisting of metal particles or clusters, at a distance, predetermined by a spacer layer, from a surface, acting as a mirror, of the reflector core produced from a metal, and this effects, on irradiation of light, an electrodynamic interaction between the clusters and of the clusters with the surface of the reflector core. When the electromagnetic field reflected by the surface onto the absorber layer formed by the metal particles is in the same phase as the incident electromagnetic wave, resonance occurs. The absorption coefficient exceeds the sum total of the absorption coefficients of the individual layers; the absorption of the metal particles is substantially amplified in this case. The Fabry-Perot effect also contributes to amplification in that the interference effects due to multiple reflections between the absorber layer and the surface effectuate an attenuation or amplification of certain wavelength ranges, whereby angle-dependent color effects are created. Such a system is marked by characteristic and angle-dependent absorption peaks of high intensity.

The metal particles forming the semitransparent absorber layer are discrete metallic clusters. The metal particles do not, in particular, form an uninterrupted layer. Each of the metal particles can constitute an individual entity capable of resonance.

In accordance with one embodiment, it has proved advantageous for the layer sequence to have an absorption with a maximum value of at least 60%, preferably 80% and more preferably 90% in the wavelength range between 300 and 800 nm at an observer angle of 45°. This provides a brilliant, metallically lustrous coloring on the part of the effect pigment.

The layer sequence, for example starting with the spacer layer, is advantageously applied directly atop the surface of the reflector core, via a coating operation. It will be advantageous in such a coating operation for the reflector cores to form very planar platelets in order that these may later, when applied in a coating, come to lie flat side by side on the article to be coated and create a high metallic luster.

Advantageously, at least one protective layer is applied on the absorber layer. A protective layer prevents detachment and/or corrosion of the discrete metal particles.

In a preferred embodiment, the metallic reflector core has an average layer thickness of from 15 to 1000 nm. It has an average diameter of from 1 to 500 µm and preferably of from 5 to 100 µm. The average diameter referred to here is the $d_{50}$ value of the cumulative undersize distribution of the size distribution curve as typically measured via laser diffraction (Frauenhofer diffraction) by means of suitable instruments, such as a Cilas 1064. In a particularly preferred embodiment, the metallic reflector core is a platelet-shaped metal pigment. This platelet-shaped metal pigment can consist of aluminum, copper, zinc, iron, titanium, chromium, silver, gold, nickel, cobalt or alloys thereof. Aluminum pigments are particularly useful since they display a strong metallic luster after application to articles in a varnish even without further coating. Application to flat and specular surfaces can further amplify the metallic impression. Useful metallic reflector cores further include nonmetallic platelet-shaped substrates coated with an additionally applied metallic reflector layer. Examples thereof are metallized platelet-shaped metal oxides or sheet-silicates, with platelet-shaped $SiO_2$ or platelet-shaped $Al_2O_3$ being particularly preferred. Pigments of this kind are disclosed for example in EP 1 438 359 A1, which are incorporated herein by reference.

The platelet-shaped metallic reflector cores have shape factors, i.e., the ratio of the average longitudinal dimension to the average thickness, of from 10 to 7000, preferably from 50 to 1000 and more preferably from 70 to 200.

As regards the spacer layer, it has proved advantageous to have a thickness of from 20 to 1000 nm and preferably of from 80 to 600 nm, so that the absorption of the resulting thin-layer construction is maximal in a range readily visible to the eye. The spacer layer can be produced from inorganic or organic materials. Inorganic materials may comprise metal oxides, metal oxide hydrates, metal nitrides, metal oxynitrides, metal fluorides, metal carbides, mixed oxides, mixed nitrides or oxynitrides, in particular silicon oxide, silicon oxide hydrates, silicon carbide, silicon nitride, aluminum oxide, aluminum nitride, aluminum oxide hydrate, tin oxide, tin nitride, titanium oxide, titanium nitride or magnesium fluoride. Useful organic materials include in particular the following polymers: polycarbonate (PC), polyethylene (PE), polypropylene (PP), polyurethane (PU), polyimide (PI), polystyrene (PS), polymethacrylate (PMA), polyvinyl alcohol (PVA), polyacrylate (PA) or nitrocellulose (NC).

The particular material of the dielectric layer also determines the magnitude of the color flop of the pigment. The choice of optically denser materials (for example titanium oxide) causes the resulting color flop to be weaker. The choice of optically more transparent materials, for example silicon oxide, causes the resulting color flop to be stronger. Accordingly, the magnitude of the color flop can be varied as desired through suitable choice of material.

The dielectric spacer layer enveloping the reflector core can be varied in its thickness. In this case, the resulting effect pigment appears in different colors. Coatings in the sol-gel process make it possible to produce transparent spacer layers having thicknesses of up to one micrometer in readily controllable and steerable operations. This permits simple production of such a spacer layer.

In a further preferred embodiment, the dielectric spacer layer is activated via a chemical coating and/or surface modification in order that the metal particles may be bound better on the spacer layer. Such activating coatings are preferably carried out with organofunctional silanes. Epoxysilanes, mercapto-silanes, isocyanatosilanes or aminosilanes are preferably used.

In a further embodiment, the metal particles can be bound directly or indirectly to the spacer layer. The proposed embodiments permit adsorptive binding of the metal particles on the spacer layer or incorporation of the metal particles in a matrix. Preferably, the metal particles may be bound covalently or chemisorptively to the spacer layer.

It has proved advantageous for the metal particles to form discrete islands having an average size of 1 to not more than 100 nm, preferably 2 to 50 nm and more preferably 3 to 35 nm for the metal particles. The metal particles preferably consist of metallically conductive materials. More particularly, the metal particles consist of: gold, silver, copper, palladium, platinum, nickel, titanium, chromium, zinc, tin, indium, cobalt or alloys thereof.

The semitransparent absorber layer comprises essentially metal particles in nanoparticulate form. Nanoparticulate form is to be understood as meaning metal particles below a size of 300 nm. More than 90% by weight, preferably more than 95% by weight and more preferably more than 99% by weight of the metal particles, based on the entire amount of the metal used in the semitransparent absorber layer, are present in nanoparticulate form. Accordingly, continuous layers of metal, as known from the prior art, are not formed.

The metal particles largely cover the surface of the effect pigments provided with a spacer layer. At a certain degree of coverage they preferentially come together to form islands. Surface coverage is 20 to 100%, preferably 30 to 100% and more preferably 50-100% of the entire surface area. This can be verified by means of scanning electron micrographs of a suitable number (about 10) of effect pigments. The point of reference here is the entire surface area of the effect pigments provided with spacer layer, except that individual unoccupied locations within the metal particle islands are not included in the count.

In a preferred embodiment, the discrete metal particles are enveloped by a dielectric matrix and/or embedded in the overall semitransparent absorber layer. This ensures a mechanically stable bound of the metal particles.

The layer thickness of the overall semitransparent absorber layer enveloping the spacer layer is not more than five times and preferably not more than twice the average diameter of the discrete metal particles. Within this relatively narrow range of thickness the above-mentioned electromagnetic interactions of the metal particles with the metallic reflector core take particularly advantageous effect.

In a particularly preferred embodiment, the average diameter of the discrete metal particles is from 10 to 25 nm and the layer thickness of the overall semitransparent absorber layer is from 20 to 40 nm.

The metal particles may further each be coated with a protective layer, so that they are stabilized to environmental effects or surrounded by molecules which cause a stabilization of the metal particles and/or make possible the attachment of the metal particles to the spacer layer.

Advantageously, the entire absorber layer is covered with a dense protective layer. This provides for the stabilization of the effect pigment to environmental effects, for example corrosion due to water or oxygen.

The protective layer on the metal particle itself and also on the absorber layer provides protection against mechanical damage and chemical effects. However, they can also alter the characteristic color spectrum in a defined manner and thereby increases the complexity of the layered construction and so has to be taken into account when a desired color is to be achieved. The protective layer can be produced from one of the following materials transparent to electromagnetic radiation: organic synthetic resins, metal oxides, metal nitrides, metal oxynitrides, metal carbides, metal fluorides, in particular from silicon oxide, silicon carbide, silicon nitride, tin oxide, tin nitride, aluminum oxide or aluminum nitride. These materials are chemically essentially inert and moisture insensitive.

The reflector cores to be coated can have different colorings prior to coating, in which case the optical effects effected by the layer sequence can be unexpectedly influenced by a departure of the reflector core from the ideal mirror. In accordance with the present invention, it has proved an advantageous embodiment for the reflector core surface which reflects electromagnetic waves to display more than 50% reflectance over at least a portion of the visible spectrum. It will additionally be advantageous for the absorber layer to have a reflectance of less than 50% over at least a portion of the visible spectrum.

The effect pigment may advantageously be constructed such that all the layers together absorb the incident light to an extent of less than 90%, so that the reflector core coloring underneath is still readily visible.

The present invention further provides a process for producing the effect pigment of the present invention, said process comprising the following steps:

aa) coating platelet-shaped metallic reflector cores with a spacer layer produced from a dielectric material and bb) applying an overall semitransparent absorber layer on the spacer layer, said absorber layer comprising essentially discrete metal particles having an average diameter of from 1 to 100 nm.

In an advantageous embodiment, at least one protective layer is applied on the absorber layer.

A further embodiment provides that the layers of the layer sequence, in particular the spacer layer and the protective layer, be at least partially deposited wet-chemically from solutions. In a particularly preferred embodiment, step aa) and/or the application of the protective layer are effected by wet-chemical sol-gel processes.

Especially PVD and/or CVD processes and the like are contemplated in addition. It is also possible to produce the layers of the layer sequence at least partially via thin-layer technology. For this reference is made to the applications of the companies Flex Products, Merck, BASF and DuPont which were cited at the beginning.

The discrete metal particles are advantageously applied in a solution-based hetero coagulation process. The hetero coagulation process is a process wherein one variety of particles is bound on another variety of particles while there is a distinct difference in the characteristic dimensions of the particles. More particularly, one variety of particles (metal particles, spherical) are metallic in nature and have a diameter of from 2 to 100 nm, while the other particles are the platelet-shaped reflector cores coated with a dielectric layer and having a diameter of from 2 to 20 μm. It has proved advantageous for the dielectrically coated reflector cores and for the metallic nanoparticles to be subjected, prior to the hetero coagulation, to a surface functionalization such that these surface functionalizations can ideally interact with each other covalently and so make possible a fixing of the nanoparticles on the absorber layer, or are bound by physisorption or by chemisorption to the surface. As an example there may be mentioned the reaction of amino-functionalized nanoparticles with glycidyl- or isocyanato-functionalized coated reflector cores. A person having ordinary skill in the art knows of a multiplicity of such suitable processes. Such a process has the advantage that already pre-defined and readily characterizable nanometal particles can be used and so process consistency is high. It can be advantageous for such an application for the hetero coagulation step to be repeated more than once, particularly preferably twice, if sufficient coverage was not achieved in the first step. The degree of coverage can be determined using existing analytical methods.

But it is also possible, in a further embodiment, to precipitate the discrete metal particles and nanoparticles wet-chemically in situ through reduction of appropriate metal salts, and thereby deposit them directly on the reflector cores. However, for this form of precipitating nanoparticles, extreme care has to be taken to exactly comply with the reaction parameters (temperature, concentrations, specific surface areas of substrate, . . . ) in order that uniform color effects may be obtained.

For further embodiments of the effect pigments, reference is made to the preceding statements.

The colored effect pigments of the present invention are usually on offer in powder form or as a paste. However, the colored effect pigments of the present invention can also find use in advantageous forms of offering such as dry products and pigment preparations. Pellets, small sausages, tablets, briquettes or granules may be mentioned here by way of example.

The colored effect pigments of the present invention further find use in paints, varnishes, powder coatings, printing inks, plastics, cosmetic formulations, ceramic materials, paper, glasses or security applications.

In a preferred embodiment, the effect pigment can be incorporated in a varnish, in which case the varnish may in turn have been applied to the surface of a material of construction. This makes it possible to apply a metallically lustrous colored pigment thus constructed to an article to be coated.

Common examples are coatings for processing on articles of daily use, for example automobiles and their body parts and the like. The coated pigment is applied in a coating at a predetermined thickness. Such a coating is permanently visible; it is very stable. The coating layer can advantageously consist of the well-known organic and/or inorganic polymers such as for example saturated or unsaturated polyester resins, alkyd resins, polycarbonates, amino or amido resins, phenolic resins, ketone or aldehyde resins, isocyanate resins, epoxy resins, polyethylene, polypropylene, polyvinyl chloride, polytetrafluoroethylene, polyvinyl alcohols or ethers, polyacrylates, polymethacrylates, polystyrene, silicone resins, etc.

Using the pigments of the present invention for pigmenting printing inks also permits, by virtue of the machine readability of markings, the use for security applications, for example for tickets, forgery-proof labels for high-value goods or other documents.

Also advantageous is in particular the use of the pigments in cosmetic formulations, for example lipsticks, nail varnishes, pens, makeups, shampoos, loose and pressed powders or eyeshadows. This is because in the eye region in particular existing legislation scarcely makes it possible to achieve metallically lustrous and intense colorations with existing pigments.

Figure 2:
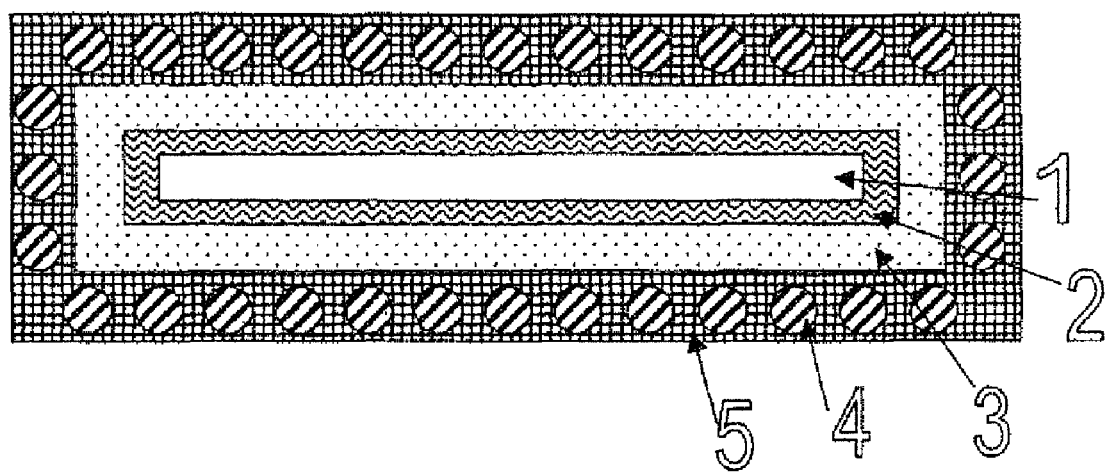
Figure 3:
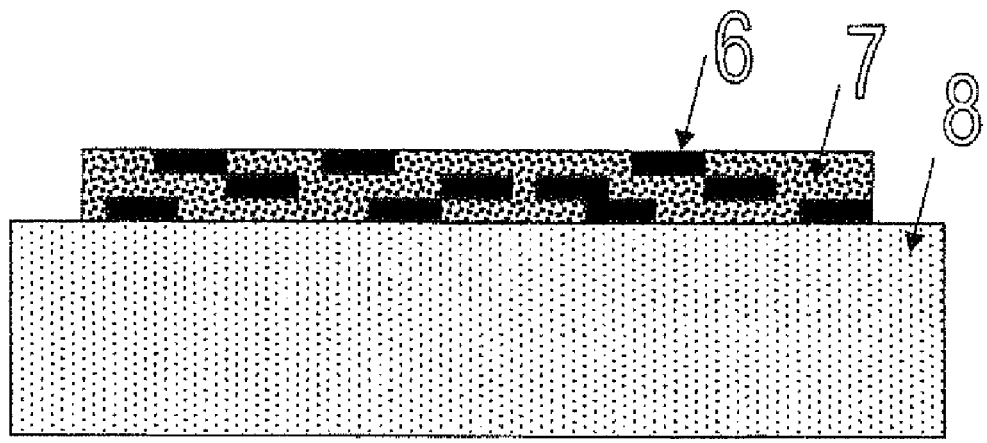
Figure 4:
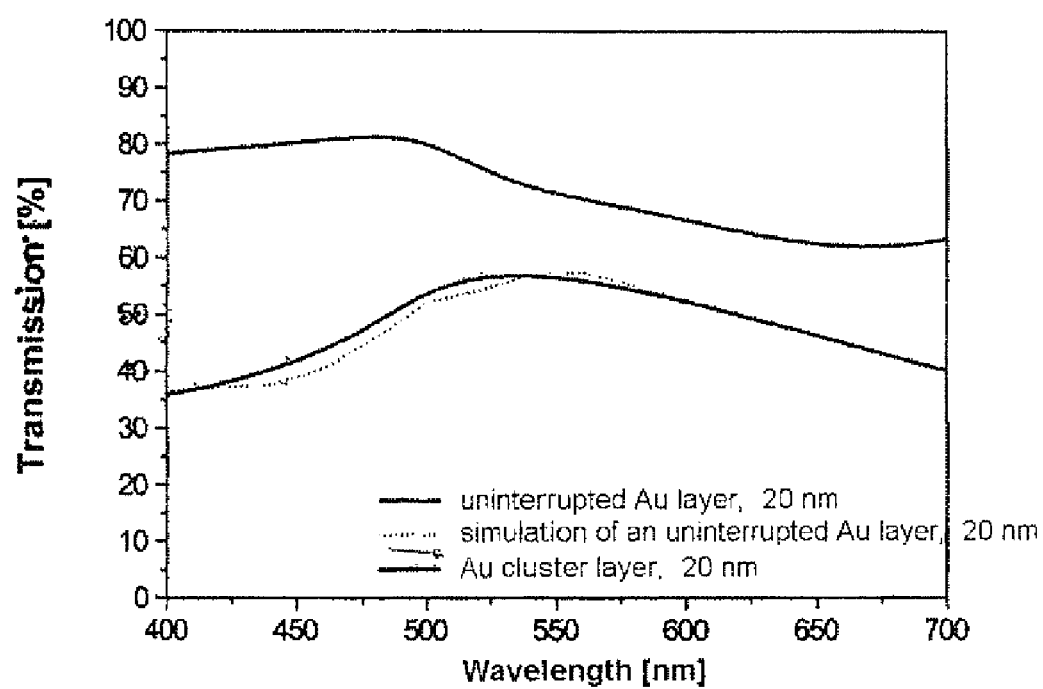
Figure 5:
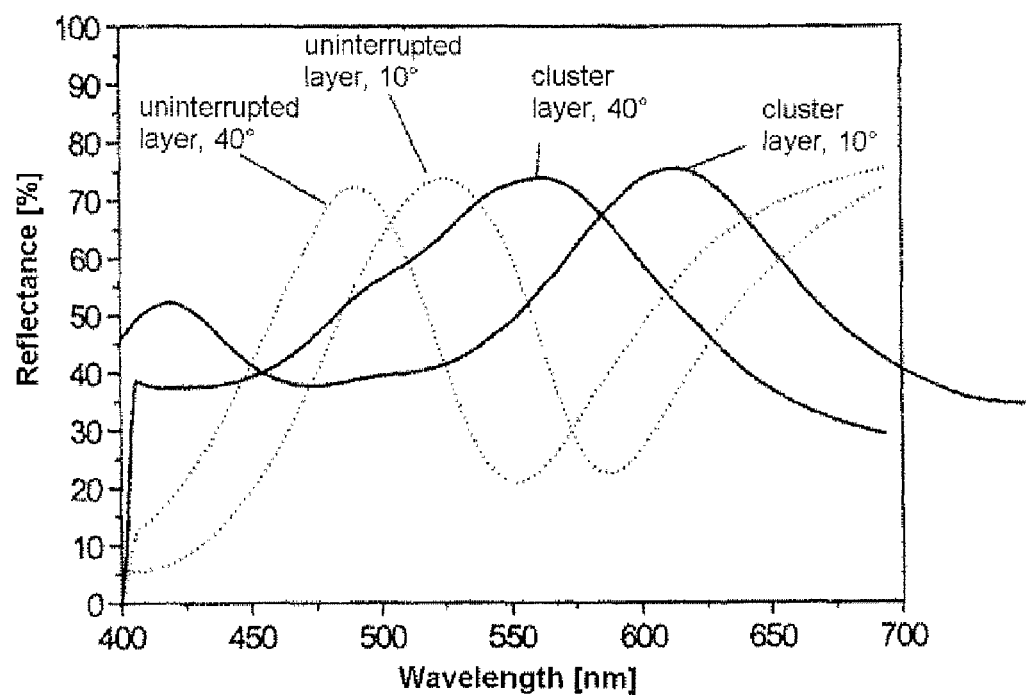
Figure 6:
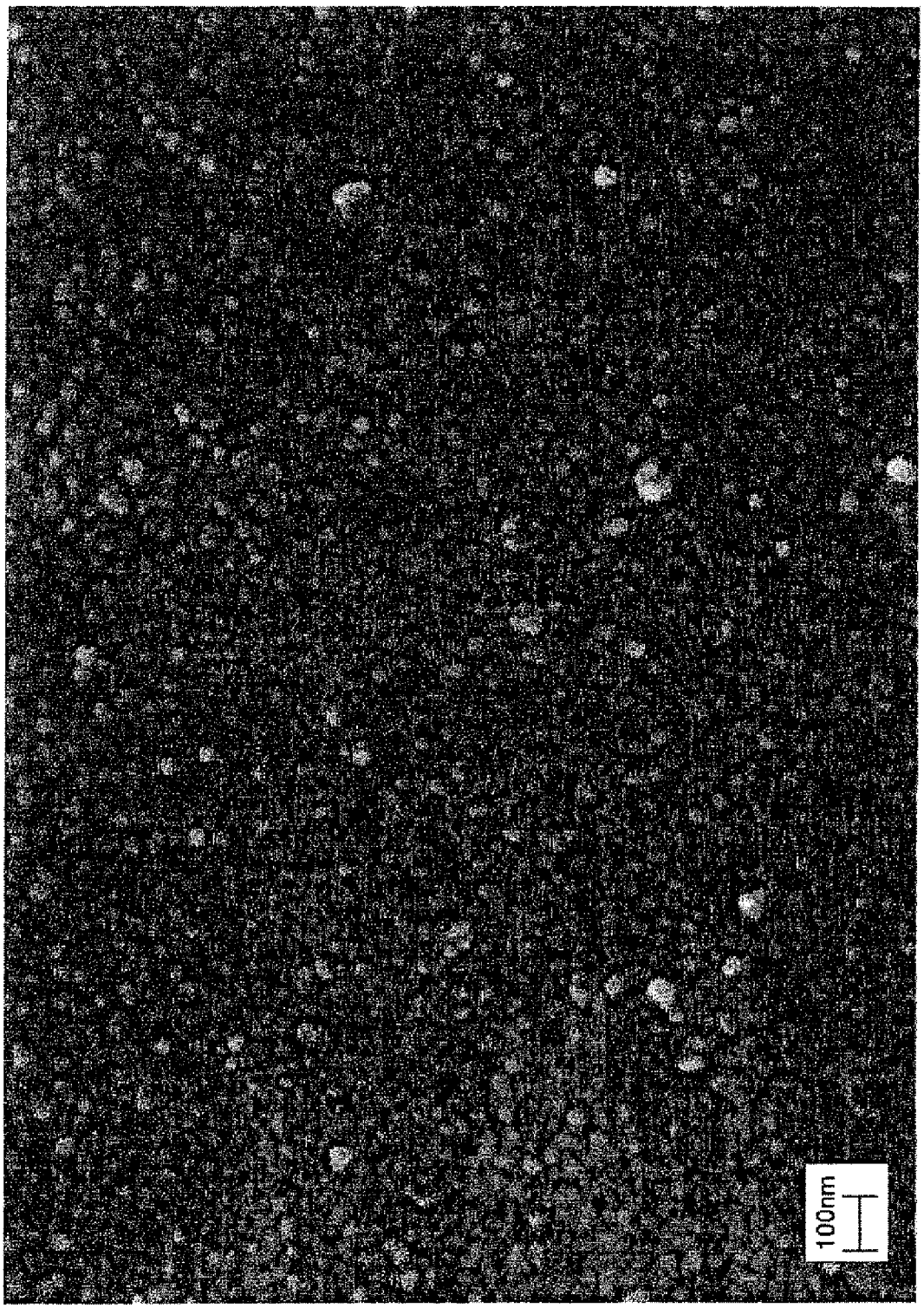
Figure 7:
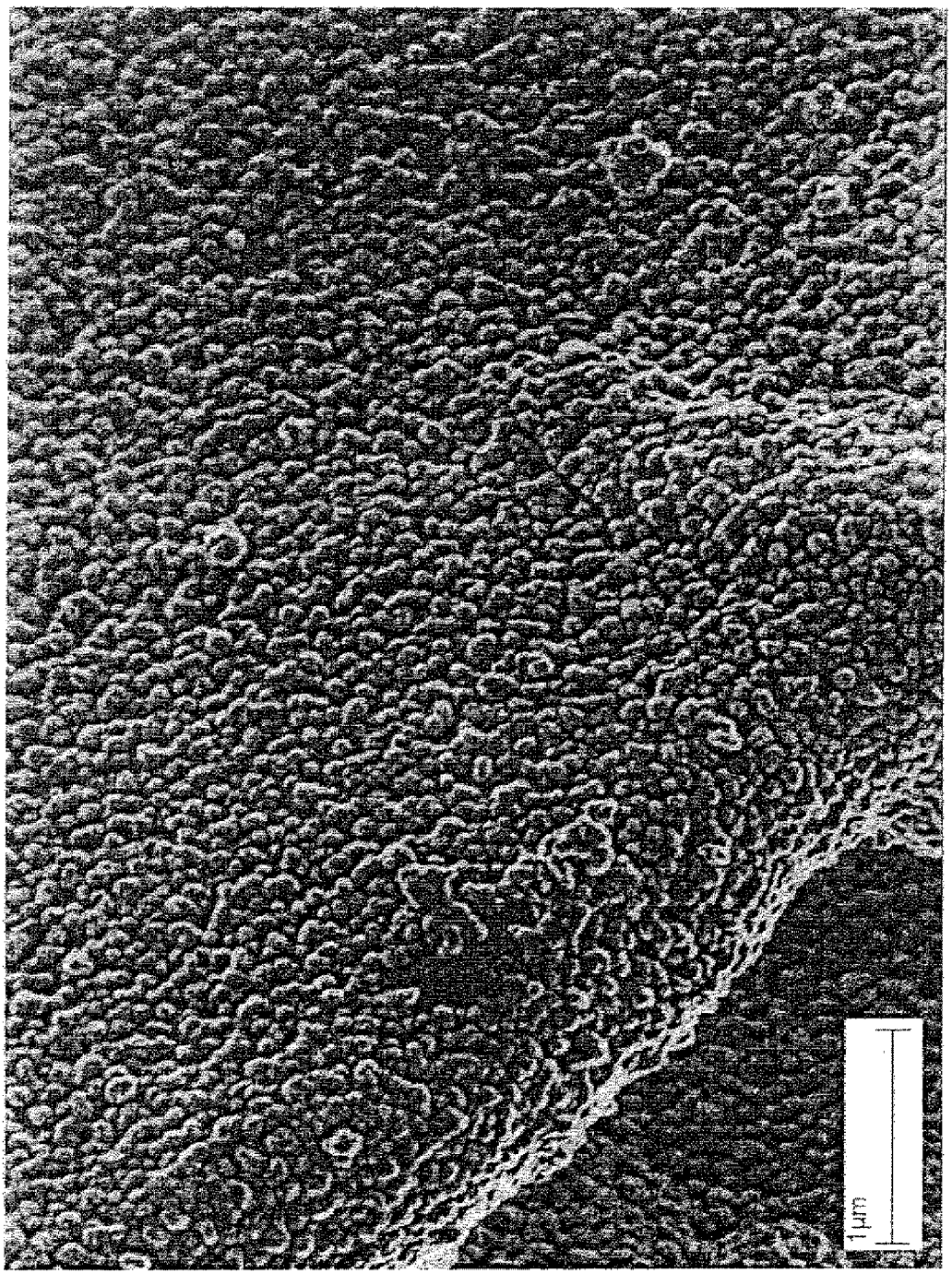

Examples of the invention will now be more particularly elucidated with reference to the drawings, where FIG. 1 shows a schematic cross-sectional view of a first effect pigment, FIG. 2 shows a schematic cross-sectional view of a second effect pigment, FIG. 3 shows a schematic cross-sectional view of the application of the effect pigment of FIG. 1 or FIG. 2 to an article with the aid of a coating, FIG. 4 shows a computed and measured transmission spectrum of a smooth metallic layer and also a measured transmission spectrum of an absorber layer of the same thickness, FIG. 5 shows measured reflectance spectra of layer sequences consisting of: a) specular layer—transparent spacer layer—semitransparent smooth metal layer, and b) specular layer—transparent spacer layer—semitransparent metal—metal particle layer of discrete particles, FIG. 6 shows a scanning electron micrograph of inventive example 1d and FIG. 7 shows a scanning electron micrograph of inventive example 2.

In FIGS. 1 and 2, reference sign 2 refers to a surface, or specular layer, reflecting electromagnetic waves. This layer may comprise a thin layer of aluminum for example. However, the specular layer 2 may also be a metallic layer which is applied on a carrier 1. Carrier 1 may comprise the pigments to be coated. The specular layer 2 can be omitted in the case of a metallically lustrous pigment or reflector core, for example an aluminum pigment.

The functioning of the effect pigment is as follows:

When ambient light or light from a light source, such as an incandescent bulb, a laser, a fluorescent tube or a xenon lamp is incident upon one of the effect pigments shown in FIGS. 1, 2 and 3, this light is reflected at the specular layer 2. Because the reflected light interacts with the absorber or metal particle layer 4 made of metal particles, a portion of the incident light is absorbed. The reflected light has a characteristic spectrum which is dependent on a plurality of parameters, for example the optical constants of the layered construction. The effect pigment has a colored appearance. The coloring does not affect the property of the metallic luster of the coated pigment because of the very low layer thickness and because of the homogeneous application. The color impression thus obtained can be angle dependent and can be identified not only with the naked eye but also with a photometer in the reflectance mode, preferably a spectrophotometer. Such a photometer can capture for example the coloring of the surfaces from two different angles. This is accomplished either by means of a detector by using two light sources which are appropriately switched on and by tilting the detector appropriately, or by two photometers measuring the sample, illuminated from two different angles, from the two corresponding angles.

With regard to the parameters to be complied with to produce interactions, the disclosure of U.S. Pat. No. 5,611,998 and WO 99/47702 is hereby incorporated herein by reference.

FIG. 4 illustrates the difference between the inventive absorber or metal particle layers and conventional layers, formed by a continuous or uninterrupted metal layer. The spectra shown in FIG. 4 were measured on microscope slides made of glass having homogeneous metal layers, or on microscope slides coated with metallic colloids. The microscope slides are 1 mm thick. These microscope slides have a gold layer 20 nm thick in each case applied to them.

Comparing the spectra depicted in FIG. 4 shows that especially metal particle layers having a thickness in the range up to 20 nm have a characteristic absorption peak which is shifted to lower wavelengths. The absorption peak is greatly broadened and asymmetrical. The spectra obtainable from a computer simulation are based on optical constants of macroscopic measurements and thus very greatly resemble the homogeneous metal layers.

FIG. 5 shows spectra of a marking according to FIG. 1, which were measured by means of the Lambda 25 UV/VIS spectrometer from Perkin Elmer using a reflectance insert. It is evident from FIG. 5 that the intensity maxima shift to shorter wavelengths as the observer angle increases. The spectra shown in FIG. 5 were measured on microscope slides coated with homogeneous metal layers or with metallic colloids. The microscope slides have a thickness of 1 mm. These microscope slides had a gold layer 20 nm in thickness in each case applied to them. The metal particle layer is covered by a spacer layer produced from $MgF_2$ having a thickness of 270 nm. The spacer layer is in turn covered by a specular layer having a thickness of 20 nm. The aforementioned layers have been applied to the microscope slides by chemical coupling or vacuum coating. The measurements were each carried out at an observer angle of 18°.

Comparison of the reflectance spectra depicted in FIG. 5 shows that metal particle layers have a characteristic absorption spectrum which, compared with the layer not formed from clusters, is shifted to higher wavelengths. In contrast to FIG. 4, which shows the pure transmission spectrum of an absorption layer formed from clusters and of an absorption layer not formed from clusters, FIG. 5 depicts the reflectance of a model system corresponding to the construction according to the present invention.

EXAMPLES

Example 1 a)—Production of Dielectrically Coated Reflector Cores 100 g of an aluminum platelets or aluminum flakes metal pigment paste (Metallux 2154 from ECKART) are dispersed in 500 ml of 75% ethanol, admixed with 242 g of tetraethoxysilane and heated to the boil. A mixture of 10 g of a 25% ammonia solution in 160 g of water is then added by metered addition over 40 h. At the end of the metered addition, the mixture is stirred under reflux for a further 10 h, and then the pigment obtained is filtered off and dried in vacuo. A product is obtained having an $SiO_2$ content of 50% and a slightly bluish hue.

b)—Silanization of the Dielectrically Coated Reflector Cores 5 g of the coated aluminum flakes of example 1 are washed with 95% ethanol. This is followed by washing with twice-distilled water and drying. The aluminum flakes are dispersed in a solution of 5 ml of 3-glycidyloxypropyltrimethoxysilane in 95 ml of 95% ethanol for 30 min and then washed twice with 95% ethanol. Thereafter they are dried at 80° C. for 30 min. The aluminum flakes are now surrounded by a layer of reactive epoxy groups.

c)—Production of Gold Nanoparticles 500 ml of a 1 mM solution of hydrogen tetra-chloroaurate (III) trihydrate in twice-distilled water are introduced into a conical flask and heated to the boil. Thereafter, 50 ml of a 38.8 mM sodium citrate solution in twice-distilled water are added. The solution is maintained at that temperature for about 30 min with continued stirring. There is a color change from yellow to blue to red. After cooling, the solution is centrifuged and the supernatant is decanted. The gold particles are then admixed with 50 ml of a solution of 50 mM L-cysteine ethyl ester and left to stand for 24 h. Subsequently, the original volume is made up again with twice-distilled water, followed by centrifuging and decanting. This is repeated twice more. At the end gold nanoparticles having a diameter between 10 and 20 nm and surrounded by free $—NH_2$ groups are obtained.

d)—Attachment of Amino-modified Gold Metal Particles to Glycidyl-modified Dielectrically Coated Reflector Cores 5 g of the epoxy-functionalized aluminum flakes of example 2 are stirred in a solution of $NH_2$-functionalized gold nanoparticles in 0.1M buffer solution of pH 8 at room temperature for 2 h, and a covalent bond forms between the epoxy groups and the $NH_2$ groups. Subsequently, the aluminum flakes, now colored, are washed with water and filtered off. To ensure continuous coating of the aluminum flakes with metal particles, further layers of gold particles can be applied. To this end, 50 ml of a 2 mm solution of glutaraldehyde are added to the aluminum flakes, followed by stirring for 3 h. The aluminum flakes are then filtered off and washed 3 times with water. The aluminum flakes are then again put into a solution of the functionalized gold particles and incubated for 3 h. The last two steps can be repeated if coverage is not yet sufficient.

Example 2

Precipitation of Silver Nanometal Particles on Dielectrically Modified Reflector Cores 8 g of silver nitrate are dissolved in 500 ml of twice-distilled water and then admixed with sufficient concentrated $NH_3$ solution until the brown precipitate which is formed in the meantime has dissolved again. Then, 20 g of the dielectrically coated metal effect pigment obtained according to example 1, 5 g of a saturated glucose solution and 5 g of a 10% KOH solution are added with stirring. Within a few seconds, the reaction solution forms a bluish purple color. After 30 min, the resulting pigment is filtered off, washed and dried in vacuo. The product obtained shows a pronounced color change from green via turquoise to purple, depending on the observer angle.

LIST OF REFERENCE SIGNS 1 metallic reflector core
2 mirror layer or specular surface
3 inert spacer layer
4 discrete metal particles
5 layer binding metal particles and/or protective layer
6 effect pigment of FIG. 1 or 2
7 coating for application of pigments
8 article of daily use

The invention claimed is:

1. An effect pigment comprising
   a) a platelet-shaped metallic reflector core (1),
   b) a spacer layer (3) of a dielectric material applied on the reflector core (1), and
   c) a semitransparent absorber layer (4) applied on the spacer layer (3) and comprising metal particles which are essentially discrete and having an average diameter of from 1 to 100 nm.

2. The effect pigment according to claim 1, wherein at least one protective layer (5) is applied on the absorber layer (4).

3. The colored effect pigment according to claim 2, wherein the protective layer consists of an organic synthetic resin or of a metal oxide.

4. The effect pigment according to claim 1, wherein the metallic reflector core (1) is produced from the group consisting of aluminum, copper, zinc, iron, titanium, chromium, silver, gold, nickel and alloys thereof.

5. The effect pigment according to claim 1, wherein the metallic reflector core (1) consists of a nonmetallic platelet-shaped substrate having a metallic reflector layer applied thereon.

6. The effect pigment according to claim 1, wherein the metallic reflector core (1) has in its longitudinal dimension a $d_{50}$ value of from 1 to 500 μm for the cumulative undersize distribution of the size distribution curve.

7. The effect pigment according to claim 6, wherein the metallic reflector core (1) has in its longitudinal dimension a $d_{50}$ value of from 5 to 100 μm for the cumulative undersize distribution of the size distribution curve.

8. The effect pigment according to claim 1, wherein the metallic reflector core (1) has an average minimum layer thickness of 40 nm.

9. The effect pigment according to claim 1, wherein the spacer layer (3) has a layer thickness of from 20 to 1000 nm.

10. The effect pigment according to claim 9, wherein the spacer layer (3) has a layer thickness of from 80 to 600 nm.

11. The effect pigment according to claim 1, wherein the spacer layer (3) is made from an inorganic or organic material.

12. The effect pigment according to claim 11, wherein the spacer layer (3) is made from at least one of the following materials: metal oxide, metal oxide hydrate, metal nitride, metal oxynitride, metal carbide or metal fluoride.

13. The effect pigment according to claim 12, wherein the spacer layer (3) is made from at least one of the following materials: silicon oxide, silicon oxide hydrate, silicon carbide, silicon nitride, aluminum oxide, aluminum oxide hydrate, magnesium fluoride, tin oxide, tin nitride, zinc oxide or zinc nitride.

14. The effect pigment according to claim 11, wherein the spacer layer (3) is made from at least one of the following organic polymers or mixtures thereof: polycarbonate (PC), polyethylene (PE), polypropylene (PP), polyurethane (PU), polyimide (PI), polystyrene (PS), polymethacrylate (PMA), polyvinyl alcohol (PVA), polyacrylates (PA), or nitro-cellulose (NC).

15. The effect pigment according to claim 1, wherein the surface of the spacer layer (3) is activated.

16. The effect pigment according to claim 1, wherein the surface is activated by coating with organofunctional silanes.

17. The effect pigment according to claim 16, wherein the surface is activated by coating with epoxysilane, mercaptosilane, isocyanatosilane; aminosilane or mixtures thereof.

18. The effect pigment according to claim 1, wherein the discrete metal particles are made from one of the following metals: gold, silver, copper, palladium, platinum, nickel, titanium, chromium, zinc, tin, indium, cobalt or from an alloy comprising one of the aforementioned metals as an essential component.

19. The effect pigment according to claim 1, wherein the discrete metal particles consist of core-shell particles.

20. The effect pigment according to claim 19, wherein the core-shell particles are composed of a core consisting of a metal and a shell consisting of a metal other than that of the core, a semiconductor material or a dielectric.

21. The effect pigment according to claim 20, wherein the core of the core-shell particles is made from one of the following metals: gold, silver, copper, palladium, platinum, nickel, titanium, chromium, zinc, tin, indium, cobalt or from an alloy comprising one of the aforementioned metals as an essential component.

22. The effect pigment according to claim 20, wherein the shell of the core-shell particles is made from one of the following semiconductors: cadmium sulfide, cadmium selenide, titanium dioxide, zinc sulfide, zinc oxide, or lead sulfide.

23. The effect pigment according to claim 20, wherein the shell of the core-shell particles is produced from one of the following nonconductors or from a mixture thereof: oxide, hydroxide, oxide hydrate of the material used for producing the core or from an oxide hydrate of the following elements: silicon, aluminum, zirconium and mixtures thereof.

24. The effect pigment according to claim 19, wherein the core-shell particles are surface modified.

25. The effect pigment according to claim 24, wherein the core-shell particles are surface modified by coating with one of the following materials: silanes, titanates, zirconates, amines, alcohols, or thiols.

26. The effect pigment according to claim 24, wherein the core-shell particles are surface modified by coating with a polymer.

27. The effect pigment according to claim 1, wherein the discrete metal particles have an average particle size of from 2 to 50 nm.

28. The effect pigment according to claim 27, wherein the discrete metal particles have an average particle size of from 3 to 35 nm.

29. The effect pigment according to claim 1, wherein the discrete metal particles are enveloped by and/or embedded in a dielectric matrix.

30. The effect pigment according to claim 1, wherein the layer thickness of the absorber layer (4) is not more than five times the average diameter of the discrete metal particles.

31. The effect pigment according to claim 30, wherein the average diameter of the discrete metal particles is of from 10 to 25 nm and the layer thickness of the absorber layer is of from 20 to 40 nm.

32. The effect pigment according to claim 30, wherein the layer thickness of the absorber layer (4) is not more than twice the average diameter of the discrete metal particles.

33. A process for producing an effect pigment according to claim 1, comprising the steps of:

aa) coating platelet-shaped metallic reflector cores (1) with a spacer layer (3) made from a dielectric material and
bb) applying an overall semitransparent absorber layer (4) on the spacer layer (3), said absorber layer (4) comprising metal particles which are essentially discrete and having an average diameter of from 1 to 100 nm.

34. The process according to claim 33, further comprising applying at least one protective layer on the absorber layer (4).

35. The process for producing an effect pigment according to claim 34, wherein the discrete metal particles are applied using a solution-based hetero coagulation process.

36. The process for producing an effect pigment according to claim 34, wherein the discrete metal particles are deposited on the spacer layer (3) wet chemically by reduction of metal salts.

37. The process for producing an effect pigment according to claim 34, wherein the discrete metal particles are coated with a protective layer using a sol-gel process or in a fluidized bed using a CVD process.

38. The process for producing a colored effect pigment according to claim 34, wherein the discrete metal particles are stabilized or modified either in the course of production or thereafter with molecules bearing functional groups.

39. The process for producing an effect pigment according to claim 33, wherein the applying of the spacer layer (3) on the reflector cores (1) is effected using a sol-gel process.

40. The process for producing an effect pigment according to claim 33, wherein the applying of the spacer layer (3) on the reflector cores (1) is effected in a fluidized bed using a CVD process.

41. A dry product or pigment preparation containing pigment according to claim 1.

42. The dry product or pigment preparation of claim 41 wherein the dry particles or pigments are in the form of pellets, sausages, tablets, briquettes or granules.

43. A paint, varnish, powder coating, printing ink, plastic, cosmetic formulation, ceramic material, paper, glass or security application containing pigment according to claim 1.

44. A process of preparing a dry product or pigment preparation comprising adding thereto an effect pigment according to claim 1.

45. The process of claim 44, wherein the dry product or pigment preparation is in the form of pellets, small sausages, tablets, briquettes or granules.

46. A process of preparing paints, varnishes, powder coatings, printing inks, plastics, cosmetic formulations, ceramic materials, paper, glasses or security devices comprising adding thereto or including therein an effect pigment according to claim 1.

\* \* \* \* \*